United States Patent
Bjarnason

(10) Patent No.: US 11,985,162 B2
(45) Date of Patent: May 14, 2024

(54) SYSTEM AND METHOD FOR DETECTING PATTERNS IN STRUCTURED FIELDS OF NETWORK TRAFFIC PACKETS

(71) Applicant: Arbor Networks, Inc., Westford, MA (US)

(72) Inventor: Steinthor Bjarnason, Fjerdingby (NO)

(73) Assignee: ARBOR NETWORKS, INC., Westford, MA (US)

( * ) Notice: Subject to any disclaimer, the term of this patent is extended or adjusted under 35 U.S.C. 154(b) by 316 days.

(21) Appl. No.: 17/678,662

(22) Filed: Feb. 23, 2022

(65) Prior Publication Data
US 2023/0269269 A1    Aug. 24, 2023

(51) Int. Cl.
*H04L 9/40* (2022.01)
*H04L 61/4511* (2022.01)

(52) U.S. Cl.
CPC ...... *H04L 63/1458* (2013.01); *H04L 61/4511* (2022.05); *H04L 63/1425* (2013.01)

(58) Field of Classification Search
None
See application file for complete search history.

(56) References Cited

U.S. PATENT DOCUMENTS

| | | | | |
|---|---|---|---|---|
| 10,187,412 | B2 * | 1/2019 | Bartos | H04L 63/1425 |
| 11,159,546 | B1 * | 10/2021 | Moore | H04L 63/1466 |
| 2018/0262467 | A1 * | 9/2018 | Jayawardena | H04L 63/0254 |

OTHER PUBLICATIONS

Cirillo, M., Di Mauro, M., Matta, V. and Tambasco, M., 2021. Botnet identification in DDoS attacks with multiple emulation dictionaries. IEEE Transactions on Information Forensics and Security, 16, pp. 3554-3569. (Year: 2021).*

Ahmed, M.E., Ullah, S. and Kim, H., 2018. Statistical application fingerprinting for DDoS attack mitigation. IEEE Transactions on Information Forensics and Security, 14(6), pp. 1471-1484. (Year: 2018).*

* cited by examiner

*Primary Examiner* — Luu T Pham
*Assistant Examiner* — Edward X Long
(74) *Attorney, Agent, or Firm* — Foley & Lardner LLP

(57) ABSTRACT

A computer method and system for determining patterns in network traffic packets having structured subfields for generating filter candidate regular expressions for DDoS attack mitigation. Stored packets are analyzed to extract a query name for each stored packet. Each query name is segregated into subfields. A Results-table is generated utilizing the segregated subfields of the query names. A Field-length table is generated that contains the length of the Field Values (Field-length) for each Field Name and an associated counter indicating how many instances the Field-length for a Field Name is present in the extracted query names. The Field-length table is analyzed to determine patterns of equal length in the "Results" table. Utilizing the Patterns table, unique combinations of the Field Values are generated as a filter candidate regular expression for DDoS attack mitigation purposes.

20 Claims, 3 Drawing Sheets

TABLE I (Results Table) — 300

| Field name | Field value | Counter |
|---|---|---|
| Field 1 | com | 42 |
| Field 2 | company | 40 |
| Field 2 | othercompany | 2 |
| Field 3 | www | 10 |
| Field 3 | dns | 30 |
| Field 4 | qwjeqwaoyeqb | 1 |
| Field 4 | ...random value of length 12... | 1 |
| Field 4 | ...random value of length 12... | 1 |
|  | ...repeated 27 more times... |  |

TABLE II (Field-length) — 320

| Field name | Field length | Counter |
|---|---|---|
| Field 1 | 3 | 42 |
| Field 2 | 7 | 40 |
| Field 2 | 12 | 2 |
| Field 3 | 3 | 40 |
| Field 4 | 12 | 30 |

TABLE III (Patterns) — 340

| Field name | Pattern | Counter |
|---|---|---|
| Field 1 | com | 42 |
| Field 2 | company | 40 |
| Field 3 | www | 10 |
| Field 3 | Dns | 30 |

TABLE IV (Patterns II) — 360

| Field name | Pattern | Counter |
|---|---|---|
| Field 1 | com | 42 |
| Field 2 | company | 40 |
| Field 3 | www | 10 |
| Field 3 | Dns | 30 |
| Field 4 | {12} | 30 |

FIG. 3

SYSTEM AND METHOD FOR DETECTING PATTERNS IN STRUCTURED FIELDS OF NETWORK TRAFFIC PACKETS

BACKGROUND

1. Field

The disclosed embodiments relate to mitigation of Denial of Service (DoS) attacks, and more particularly to determining DoS mitigation filter candidates through detecting patterns in structured fields of network traffic packets.

2. Description of Related Art

The Internet is a global public network of interconnected computer networks that utilize a standard set of communication and configuration protocols. It consists of many private, public, business, school, and government networks. Within each of the different networks are numerous host devices such as workstations, servers, cellular phones, portable computer devices, to name a few examples. These host devices are able to connect to devices within their own network or to other devices within different networks through communication devices such as hubs, switches, routers, and firewalls, to list a few examples.

The growing problems associated with security exploits within the architecture of the Internet are of significant concern to network providers. Networks and network devices are increasingly affected by the damages caused, for instance, by DNS misuse. Some examples of domain name system (DNS) misuse that make use of highly variable name lookups include pseudorandom label attacks, DNS data exfiltration, and DNS tunneling. In these examples of DNS misuse, DNS requests use highly variable values for names queried in the requests.

It is to be understood the DNS namespace is divided into DNS zones. For instance, "example.com" may be a zone which contains the names www, mail, and testing. DNS clients send query messages to servers requesting the translation of names to addresses. A class of denial of service (DoS) attacks called "DNS Water Torture" occurs when one or many clients perform many malicious queries for randomized names in a specific DNS zone. These names do not exist, but the server has to spend resources checking its name database and responding with an error message. Such attacks can consume so many resources that legitimate queries go unanswered.

Prior solutions for such DNS water torture attacks failed to adequately address the problem for two principle reasons: (1) they could not scale up to the storage required to maintain a pass-list for millions of names spread across thousands of DNS zones, and (2) due in part to the inadequate scaling, they relied on a just-in-time transfer of the names in a DNS zone. This just-in-time transfer placed extra load on an already burdened server, and may not have even been successful due to this high load.

Accordingly, such conventional methods and systems have generally been considered satisfactory for their intended purpose, thus there exist the need for an improved system and method for detecting DNS misuse that does not require the aforesaid just-in-time transfer of names in a DNS zone.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

Generally, the illustrated embodiments relate to a system and method for mitigating DoS network attacks in which query names, such as for example DNS query names (which are be present in both DNS queries and in the question part of DNS query responses) are segregated into subfields based on the zone cuts so as to analyze each subfield independently. The analyzed results are then by combined into a verified Regular expression enabling detection of attacks which randomize parts of the DNS query name enabling generation of DNS attack mitigation filters used to block attacks, such as DNS Water Torture attacks and DNS Reflection/Amplification attacks.

To achieve these and other advantages and in accordance with the purpose of the illustrated embodiments, in one aspect, described is computer method and system for determining patterns in network traffic packets having structured subfields for generating filter candidate regular expressions for DDoS attack mitigation. Stored packets are analyzed to extract a query name for each stored packet. Each query name is segregated into subfields based upon a full stop character "." in each query name starting at the top-level domain (TLD) of each query name whereby a first subfield corresponds to a TLD of each query name. A Results-table is generated utilizing the segregated subfields of the query names, wherein the Results-table includes a Field Name associated with a Field Value and counter value indicating how many instances the associated Field Value is present in the associated Field Name for the extracted query names. Utilizing the Results-table, a Field-length table is generated that contains the length of the Field Values (Field-length) for each Field Name and an associated counter indicating how many instances the Field-length for a Field Name is present in the extracted query names. The Results table and the Field-length table are sorted based on respective counter values for individual field values. Field name entries are eliminated from the Results-table that do not exceed a threshold value of the number of extracted query names, hereinafter referred to as the Patterns-table. The Field-length table is analyzed to determine, for each Field and Field-length value, patterns of equal length in the "Results" table whereby their counter values are added together ("sum value") which sum value is then subtracted from the counter for the Field-length table entry whereby if a resultant remainder value exceeds the threshold value, the Field-length value and counter are inserted to the Patterns table. Counter values for each Field-length are added together which value is subtracted from the total count of DNS packets. If a remainder value exceeds a threshold value, an additional entry containing the value '*' for that field is added to the Field-length table. Utilizing the Patterns table, unique combinations of the Field Values are generated by inserting a full stop character "." between each Field Value wherein each generated unique combination is a filter candidate regular expression for DDoS attack mitigation purposes. The unique combinations of the Field Values are generated in reverse order relative to a query name.

BRIEF DESCRIPTION OF THE DRAWINGS

So that se skilled in the art to which the subject disclosure appertains will readily understand how to make and use the devices and methods of the subject disclosure without undue experimentation, illustrated embodiments thereof will be described in detail herein below with reference to certain figures, wherein:

FIG. 3 illustrates exemplary Tables generated in accordance with the process of FIG. 2.

DETAILED DESCRIPTION OF CERTAIN EMBODIMENTS

Figure 1:
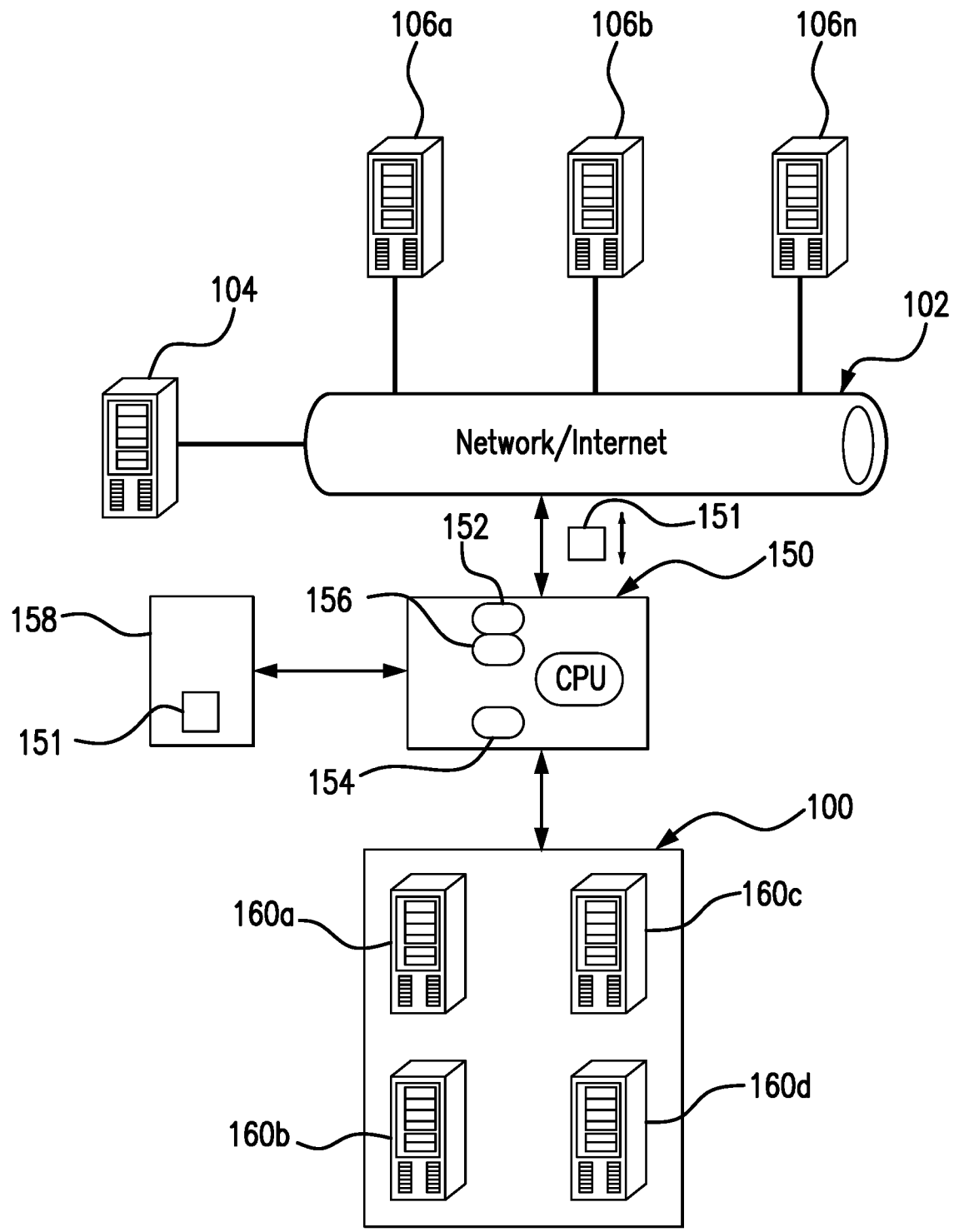
FIG. 1 is a schematic diagram showing network architecture and the relationship between an attack mitigation device and a protected network according to an illustrated embodiment.

Aspects of the disclosed embodiments are illustrated in the following description and related drawings directed to specific illustrated embodiments. Alternate embodiment's may be devised without departing from the scope of the illustrated embodiments. Additionally, well-known elements of the illustrated embodiments will not be described in detail or will be omitted so as not to obscure the relevant details of the illustrated embodiments.

The word "exemplary" is used herein to mean "serving as an example, instance, or illustration." Any embodiment described herein as "exemplary" is not necessarily to be construed as preferred or advantageous over other embodiments. Likewise, the term "illustrated embodiments" does not require that all illustrated embodiments include the discussed feature, advantage or mode of operation.

Unless defined otherwise, all technical and scientific terms used herein have the same meaning as commonly understood by one of ordinary skill in the art to which the illustrated embodiments belong. Although any methods and materials similar or equivalent to those described herein can also be used in the practice or testing of the illustrated embodiments, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. The terminology used herein is for the purpose of describing particular embodiments only and is not intended to be limiting of the illustrated embodiments. It will be further understood that the terms "comprises", "comprising, ", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence of actions described herein can be considered to be embodied entirely within any form of computer readable storage medium having stored therein a corresponding set of computer instructions that upon execution would cause an associated processor to perform the functionality described herein. Thus, the various aspects of the illustrated embodiment's may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the illustrated embodiments based on the below-described embodiments. Accordingly, the embodiments described herein are not to be limited by what has been particularly shown and described, except as indicated by the appended claims.

It is to be further understood the illustrated embodiments of the present illustrated embodiments describe a system, apparatus and process for avoiding and mitigating the harmful effects of a DDoS attack on a computer system/device or network.

Turning now descriptively to the drawings, in which similar reference characters denote similar elements throughout the several views, FIG. 1 illustrates the relationship between a protected network 100, attack mitigation device 150, Internet 102, and external host devices 106a, 106b . . . 106n, 104.

In a typical implementation, the external host devices 106a, 106b . . . 106n, 104 (also referred to as external devices or host devices) attempt to connect to protected devices 160 within the protected network 100 typically via a private network or a public computer network such as the Internet 102. Examples of external host devices include servers, laptops, desktop computers, tablet devices, mobile phones, mobile computing devices, video games systems, televisions and other similar devices and systems having Internet connectivity.

In a preferred illustrated embodiment, the protected network 100 is protected by the attack mitigation device 150 preferably located between the Internet 102 and the protected network 100. Usually, the protected network 100 is an enterprise network, such as a school network, business network, and government network, to list a few examples. In other embodiments, the attack mitigation device 150 is located within the Internet, service provider network or enterprise network rather than as a network edge as illustrated. It is to be appreciated that when deployed within the protected network, traffic is diverted to the mitigation device 150.

The mitigation device 150 preferably includes a packet processing system preferably having an external high-speed network interface 152 and a protected high-speed network interface 154. Under current technology, these interfaces are capable of handling 1.0-100 Gbps, for example. The mitigation device 150 may further include processors 156 that preferably process the packets 151 received at interfaces 152 and 154. Additionally, a central processing unit (CPU), random access memory (RAM), and a storage medium 158 are preferably used to further support the processing of the received packets and are described in detail below in conjunction with FIG. 2. The storage medium 158 also preferably stores hash structures and filter candidates, as described in detail below.

In a typical implementation, the mitigation device 150 authenticates all external host devices 106a, 106b . . . 106n, 104 before allowing the external devices to access the protected devices 160 within the protected network 100.

According to exemplary configuration illustrated in FIG. 1, the attack mitigation device 150 may comprise a Client Edge (CE) device. The CE device can provide entry points into the protected network 100. In alternative configuration, the attack mitigation device 150 may comprise a virtual device. In other words, at least some of the embodiments do not require the attack mitigation device 150 to be a physical hardware device or to be located in a particular part of the network infrastructure, as long as the attack mitigation device 150 can be in the path of the incoming traffic to the protected network 100.

Figure 2:
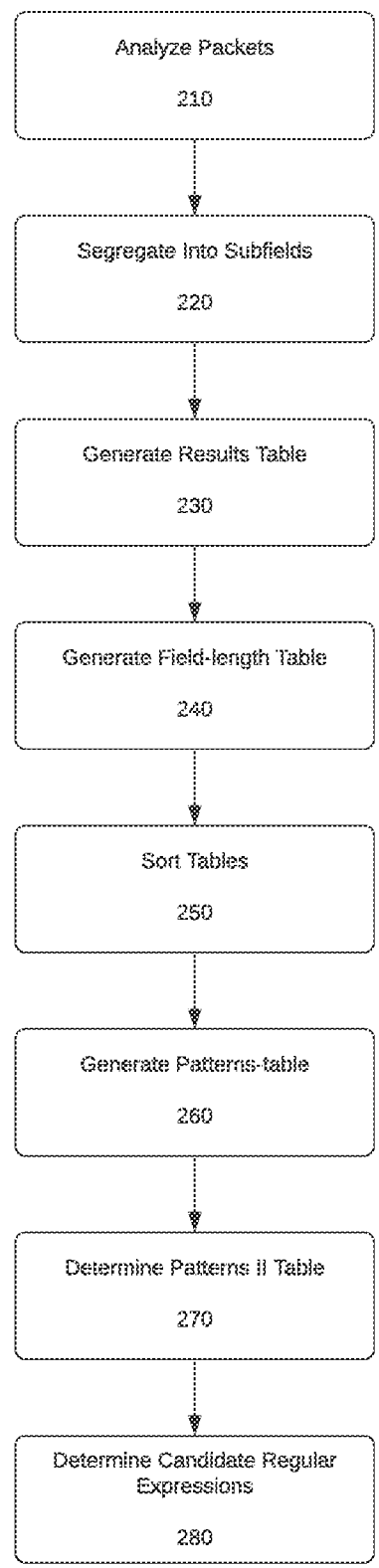
FIG. 2 is a flowchart illustrating a process for detecting patterns in structured fields of network traffic packets.

Turning to FIG. 2, illustrates is an exemplary and non-limiting flowchart depicting a method for mitigating network attacks in mitigation device 150 in accordance with certain illustrated embodiments. Before turning to description of FIG. 2, it is noted that the flow diagram in FIG. 2 illustrates exemplary operational steps carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

It is to be appreciated that the below described embodiments generally relate to a network attack mitigation device (150) configured and operable to analyze aspects of observed network traffic packets for detecting structured subfields in network traffic packets, such in DNS query name packets. It is to be appreciated that the below illustrated embodiments are described with reference to detecting structured subfields in DNS query name packets for ease of description and exemplary purposes. Thus, the illustrated embodiments are not to be understood to be limited to detecting structured subfields in DNS query name packets, as it is to be understood the illustrated embodiments detect subfields in various types of network traffic packets when applicable for generating filter candidates for mitigation of network attacks. Hence, in accordance with the below exemplary illustrated embodiment, described is a system and process for mitigating DoS network attacks in which query names, such as for example DNS query names (which are be present in both DNS queries and in the question part of DNS query responses) are segregated into subfields, based on the zone cuts, for analyzing each subfield independently. The analyzed results are then by combined into a verified Regular expressions enabling detection of network attacks which randomize parts of the DNS query name so as to enable generation of DNS attack mitigation filters used to block network attacks, such as DNS Water Torture attacks and DNS Reflection/Amplification attacks.

With reference now to FIG. 2 (and with continued reference to FIG. 1) described now is an exemplary process (referenced generally by 200), utilizing an attack mitigation device (e.g., 150) for mitigating a Distributed Denial of Service (DDoS) attack to one or more protected computer networks 100 by determining patterns in network traffic packets (e.g., Domain Name Server (DNS) packets) having structured subfields for generating filter candidate regular expressions for DDoS attack mitigation techniques.

It is to be appreciated that the attack mitigation device 150 preferable intercepts network traffic packets 151 flowing from one or more external computers 106a-106n, 104 to one or more protected computer networks 100, the intercepted network traffic packets 151, in the present illustrative example, include DNS packets. The intercepted DNS packets are preferably stored in a storage device 158 operable associated with the mitigation device 150. For instance, the intercepted DNS queries and/or responses may be stored in Packet Capture (PCAP) files in the storage device 158. It is to be appreciated that in accordance with the illustrative embodiments, a predetermined number of DNS packets (e.g., 10,000 packets) are stored in the storage device 158 (e.g., in the PCAP files) sufficient to provide an accurate representation of suspected attack traffic.

Starting at step 210, the aforesaid stored packets in storage device 158 are analyzed which is preferably a snapshot of network traffic containing an accurate representation of the suspected DNS query name attack traffic (e.g., 10,000 packets), whereby each packet and payload is analyzed as described herein. It is to be appreciated, and as mentioned above, in accordance with the exemplary illustrated embodiments, captured packets 151 in storage 158 containing DNS queries or DNS responses are considered. It is to be understood a separate process is to be performed for packets containing DNS queries and DNS responses (which also contain the requested DNS query name) as the described process 200 is applicable to both scenarios.

Specifically, the packets are analyzed to preferably extract a query name for each stored/captured packet 151 in storage medium 158. Next, at step 220 each extracted query name is segregated into subfields based upon a full stop character "." in each query name starting at the top-level domain (TLD) of each query name whereby a first subfield corresponds to a TLD of each query name. For example, the DNS query name www.company.com would be segregated into the following fields: Field (1) "com"; Field (2) "company"; and Field (3) "www". The DNS query name "qwjeqwaoyeqb.dns.company.com" is segregated into the following fields: Field (1) "com"; Field (2) "company"; Field (3) "dns"; and Field (4) "qwjeqwaoyeqb". And the DNS query name "ns1.othercompany.com" is segregated into the following fields: Field (1) "com"; Field (2) "othercompany"; and Field (3) "ns1".

Next at step 230, the process 200 generates a Results-table 300 (Table I, FIG. 3) utilizing the segregated subfields of the query names. As shown in the example of FIG. 3, the Results-table 300 preferably includes a Field Name 305 associated with a Field Value 310 and Counter value 315 indicating how many instances the associated Field Value is present in the associated Field Name for each extracted query name. If the Results-table 300 already contains the specific Field value 310, a Counter 315 is increased for that specific Field value 310.

Once the Results-table 300 is generated (step 230), the process 200 then preferably, utilizing the Results-table 300, generates in step 240 a Field-length table 320 (Table II, FIG. 3) containing the length of the Field Values (Field-length) 330 for each Field Name 325 and an associated Counter 335 indicating how many instances the Field-length for a Field Name is present in the extracted query names (step 210). The Results table 300 and Field-length table 320 are then sorted the based on respective counter values (315, 335) for individual field values, step 250. For instance, and in accordance with the above exemplary Tables I (300) and II (320) and the exemplary 42 DNS queries scenario, the first example, "www.company.com" is seen 10 times, and queries which are structurally similar to the second query "qwjeqwaoyeqb.dns.company.com" except the value of the first field is variable but same length, are seen 30 times, whereby the third example "ns1.othercompany.com" is seen 2 times.

Next, at step 260, the process then generates a Patterns-table 340 (Table III, FIG. 3) by eliminating Field name entries 305 from the Results-table 300 that do not exceed a threshold value of the number of extracted query names (step 210). As shown in Table III, the Patterns-table 340 includes each Field name 345 with its corresponding Pattern 350 and Counter value 355. After the Patterns-table 340 is generated, the process 200 then at step 270 analyzes the Field-length table 320 to determine, for each Field 325 and Field-length value 330, patterns of equal length in the "Results" table 300 whereby their respective counter values 315 are added together ("sum value") which sum value is then subtracted from the respective counter 335 for the Field-length table 320 entry whereby if a resultant remainder value exceeds the threshold value, the Field-length value (325, 330) and associated Counter value 335 are inserted to the Patterns table 340 (e.g., Field name 345, Pattern 350 and Counter value 355). After all entries in the Field-length table 320 are analyzed, all Counter values 335 for each Field-length 330 are added together which value is subtracted from the total count of captured DNS packets, whereby if a remainder value exceeds a threshold value, a special catch-all entry (e.g., containing the value '*') for that field are inserted into the Patterns table II 360 (365, 370, 375) as shown in exemplary Table IV of FIG. 3.

For instance, and in accordance with the above exemplary scenario, for "Field 3" (345), the "field-length" value (320) would not be inserted into the Patterns table II 360 as the sum of current patterns for "Field 3" (325) with length 3 in the Patterns table 340 is 42, whereby 42−42=0 (0%), thus there is no room for a more generic pattern. And when analyzing "Field 4", the sum of existing patterns in the Results table 300 is 0, whereby 30−0=30 (75%) which exceeds the threshold value of 5%, thus the pattern "{12}" is added for "Field 4" to the Patterns II table 360. It is to be appreciated and understood that when all counter values for each field are added together and the sum is subtracted from the total count of DNS packets, and if the remainder exceeds the threshold value, a special catch-all entry (e.g., containing the value '*') for that field is preferably added to the Patterns II table 360.

Once the Patterns II table 360 has been determined (step 270), the process 200 at step 280 generates, utilizing the Patterns II table 360, unique combinations of the Field Values (e.g., 370) by inserting a full stop character "." between each Field Value wherein each generated unique combination is a filter candidate regular expression for DDoS attack mitigation purposes. The unique combinations of the Field Values are preferably generated in reverse order relative to a query name. For instance, and in accordance with the above exemplary scenario of the Patterns II table 360 of FIG. 3, this would result in the following 6 candidate Regular expression results: 1) "{12}.dns.company.com"; 2) "{12}.www.company.com"; 3) "dns.company.com"; 4) "www.company.com"; 5) "company.com"; and 6) "corn".

In accordance with the illustrated exemplary embodiments, the candidate Regular expressions are then evaluated across all packets in the PCAP stored in storage medium 158 which contain DNS query names. Candidate Regular expressions which match more than the threshold value are accepted, resulting, in accordance with the above exemplary scenario, the following 2 regular expressions which match 95.2% of the DNS: 1) {12}.dns.company.com; and 2) www-.company.com. And to reduce the risk of overblocking (e.g., blocking good traffic by a DDoS mitigation filter), regular expressions which match legitimate user traffic are preferably removed. For instance, in accordance with the above illustrated exemplary scenario, the regular expression "www.company.com" would match a high percentage of legitimate request and would therefore be removed as a filter candidate, resulting in the following regular expression which matches 71.5% (30 divided by 42) of the DNS queries: "{12}.dns.company.com". It is to be appreciated that to identify patterns which match legitimate traffic, the above described process 200 may be executed using non-attack data, storing the results as white-listed patterns for use when analyzing attack data.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

In summary, various embodiments of the present illustrated embodiments disclose a novel approach for mitigating network attacks in which query names are segregated into subfields based on the zone cuts so as to analyze each subfield independently. The analyzed results are then combined into a verified Regular expression enabling detection of attacks which randomize parts of the DNS query name enabling generation of candidate regular expression for use in attack mitigation filters for blocking network attacks, such as DNS Water Torture attacks and DNS Reflection/Amplification attacks. For instance, the above described process and system is particularly advantageous in that it enables detection of patterns in query name sections of DNS queries and responses, thus providing rapid classification and mitigation of DDoS attacks.

It is to be understood the various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The flowchart and block diagrams in the Figures illustrate the architecture, functionality, and operation of possible implementations of systems, methods and computer program products according to various embodiments of the present illustrated embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various illustrated embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method performed by a computer system having one or more processors and memory storing one or more programs for execution by the one or more processors for mitigating a distributed denial of service (DDoS) attack to one or more protected computer networks by determining patterns in network traffic packets having structured subfields for generating filter candidate regular expressions for DDoS attack mitigation, the method comprising the steps of:
    analyzing stored packets to extract a query name for each stored packet;
    segregating each query name into subfields based upon a full stop character "." in each query name starting at the top-level domain (TLD) of each query name whereby a first subfield corresponds to a TLD of each query name;
    generating a results table utilizing the segregated subfields of the query names, wherein the results table includes a field name associated with a field value and counter value indicating ho w many instances the associated field value is present in the associated field name for each extracted query name;
    generating, utilizing the results table, a field length table that contains the length of the field values as a field length for each field name and an associated counter indicating how many instances the field length for a field name is present in the extracted query names;
    sorting the results table and the field length table based on respective counter values for individual field values;
    eliminating field name entries from the results table that do not exceed a threshold value of the number of extracted query names to generate a patterns table;
    analyzing the field length table to determine, for each field and field length, patterns of equal length in the results table whereby their counter values are added together to generate a sum value which is then subtracted from the counter for the field length table entry whereby if a resultant remainder value exceeds the threshold value, the field length and counter are inserted into the patterns table, wherein after the field length table is analyzed, all counter values for each field length are added together which value is subtracted from a total count of Domain Name system (DNS) packets, whereby if a remainder value exceeds a threshold value, an additional entry containing the value '*' for that field is added to the field length table; and
    generating, utilizing the patterns table, unique combinations of the field values by inserting a full stop character "." between each field value wherein each generated unique combination is a filter candidate regular expression for DDoS attack mitigation purposes, wherein the unique combinations of the field values are generated in reverse order relative to a query name; and
    blocking a network according to the generated filter candidate regular expression.

2. The method as recited in claim 1, wherein all unique combinations of the field values are generated.

3. The method as recited in claim 1, further including the step evaluating each generated candidate regular expression to determine if it matches a threshold value of same extracted query names whereby if it is determined a threshold value is not matched, such a generated candidate regular expression is eliminated for DDoS mitigation usage.

4. The method as recited in claim 1, wherein the network traffic packets include DNS packets.

5. The method as recited in claim 4, wherein the DDoS attack is one of a reflection attack or amplification attack.

6. The method as recited in claim 4, wherein the DDoS attack is a DNS water torture attack.

7. The method as recited in claim 1, further including:
    intercepting network traffic packets flowing from one or more external computers to the one or more protected computer networks; and
    storing the intercepted packets in a storage device.

8. The method as recited in claim 7, wherein the DNS packets include DNS queries and DNS query responses.

9. The method as recited in claim 8, wherein the storage device contains Packet Capture (PCAP) files.

10. The method as recited in claim 9, wherein a predetermined number of DNS responses are stored in the PCAP.

11. A computer system for mitigating a distributed denial of service (DDoS) attack to one or more protected computer networks by determining patterns in network traffic packets having structured subfields for generating filter candidate regular expressions for DDoS attack mitigation, comprising:
    one or more data bases having memory configured to store instructions;
    a processor disposed in communication with the memory, wherein the processor upon execution of the instructions is configured to:
    analyze stored packets to extract a query name for each stored packet;
    segregate each query name into subfields based upon a full stop character "." in each query name starting at the top-level domain (TLD) of each query name whereby a first subfield corresponds to a TLD of each query name;
    generate a results table, utilizing the segregated subfields of the query names, wherein the results table includes a field name associated with a field value and counter value indicating ho w many instances the associated field value is present in the associated field name for each extracted query name;
    generate, utilizing the results table, a field length table that contains the length of the field values as a field length for each field name and an associated counter indicating how many instances the field length for a field name is present in the extracted query names;

sort the results table and the field length table based on respective counter values for individual field values;

eliminate field name entries from the results table that do not exceed a threshold value of the number of extracted query names, hereinafter referred to as the patterns table;

analyze the field length table to determine, for each field and field length, patterns of equal length in the results table whereby their counter values are added together to generate a sum value which is then subtracted from the counter for the field length table entry whereby if a resultant remainder value exceeds the threshold value, the field length and counter are inserted to the patterns table, wherein after the field length table is analyzed, all counter values for each field length are added together which value is subtracted from a total count of Domain Name System (DNS) packets, whereby if a remainder value exceeds a threshold value, an additional entry containing the value '*' for that field is added to the field length table; and generate, utilizing the patterns table, unique combinations of the field values by inserting a full stop character "." between each field value wherein each generated unique combination is a filter candidate regular expression for DDoS attack mitigation purposes, wherein the unique combinations of the field values are generated in reverse order relative to a query name; and block a network according to the generated filter candidate regular expression.

12. The computer system as recited in claim 11, wherein all unique combinations of the field values are generated.

13. The computer system as recited in claim 11, wherein the processor is further configured to evaluate each generated candidate regular expression to determine if it matches a threshold value of same extracted query names whereby if it is determined a threshold value is not matched, such a generated candidate regular expression is eliminated for DDoS mitigation usage.

14. The computer system as recited in claim 11, wherein the network traffic packets include DNS packets.

15. The computer system as recited in claim 14, wherein the DDoS attack is one of a reflection attack or amplification attack.

16. The computer system as recited in claim 14, wherein the DDoS attack is a DNS Water Torture attack.

17. The computer system as recited in claim 11, wherein the processor is further configured to:

intercept network traffic packets flowing from one or more external computers to the one or more protected computer networks; and store the intercepted packets in a storage device.

18. The computer system as recited in claim 17, wherein the DNS packets include DNS queries and DNS query responses.

19. The computer system as recited in claim 18, wherein the storage device contains Packet Capture (PCAP) files.

20. The computer system as recited in claim 19, wherein a predetermined number of DNS responses are stored in the PCAP.

* * * * *